United States Patent Office 3,354,162
Patented Nov. 21, 1967

3,354,162
HEXAHYDROBENZO[6,7]CYCLOHEPTA[1,2,3-d,e]
ISOQUINOLINE CARBOXAMIDINE
Leslie G. Humber, Dollard des Ormeaux, Quebec, and Martin A. Davis, Montreal, Quebec, Canada, assignors to American Home Products Corporation, New York, N.Y., a corporation of Delaware
No Drawing. Filed Mar. 29, 1966, Ser. No. 538,212
8 Claims. (Cl. 260—286)

This invention relates to certain novel polycyclic isoquinoline carboxamidine derivatives comprising 1,2,3,7,8,12b - hexahydrobenzo[6,7]cyclohepta[1,2,3,-d,e] isoquinoline-2 carboxamidine and derivatives thereof, of the general Formula I:

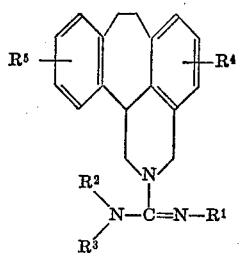

I in which $R^1$, $R^2$ and $R^3$ may be identical or different, and may represent hydrogen or lower alkyl, and $R^4$ and $R^5$ may represent one or more substituents on an aromatic ring, such substituents including lower alkyl, halogen, hydroxyl, lower alkoxy, alkylthio, and trihalomethyl.

Preferred compounds falling within the scope of our invention are those wherein $R^4$ and $R^5$ in the above Formula I represent hydrogen. This preferred subclass of compounds falling within the scope of our invention, and possessing the useful pharmacological properties as enumerated, may be represented by the Formula Ia:

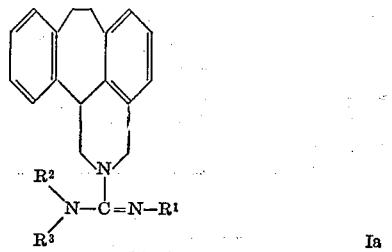

Ia

The compounds of this invention, of Formula Ia, possess useful pharmacological properties as hypotensive agents and as antibacterial agents, being active against gram-positive and gram-negative microorganisms, such as, for example, Staphylococcur pyogenes (both penicillin-sensitive and penicillin-resistant strains), Sarcina lutea, Streptococcus faecalis, Escherichia coli, Aerobacter aerogenes, Salmonella pullorum, Pseudomonas aeruginosa, Protenus mirabilis and Protenus vulgaris. As anti-bacterial agents for topical use, the compounds of Formula Ia, may be formulated as their free bases or as salts with pharmacologically acceptable acids, in solutions, creams, or lotions with pharmacologically acceptable vehicles containing from 0.1 to 1.0 percent of the active ingredient. Such formulations may be applied topically to the site of infection as required. As hypotensive agents, the compounds of this invention may be administered, as their free bases or as their salts with pharmacologically acceptable acids, in divided doses totalling from 10 to 500 mg. per day, in the form of tablets or capsules formulated with suitable excipients such as, for example, starch, lactose, magnesium trisilicate, or magnesium stearate.

Alternatively, the compounds of this invention in the form of their salts with pharmacologically acceptable acids, may also be administered parenterally, in the form of physiologically acceptable solutions containing from 5 to 50 mg. per milliliter of the active ingredient.

This invention also relates to processes for the preparation of the pharmacological active compounds described herein. These processes are illustrated schematically below and are described further in the examples.

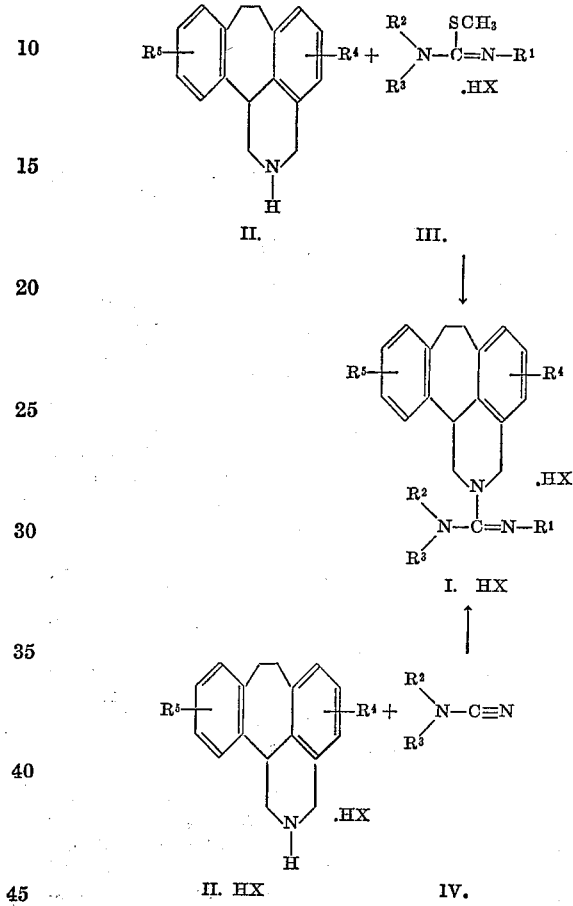

The starting materials of Formula II may be prepared by reacting 2-oxo-1,6,7,11b-tetrahydro-2H-dibenz[cd,h] azulene described by C. Van der Stelt et al. in Receuil des Travaux de Chimie de Pays-Bas, volume 84, page 1466 (1965) with sodium azide in trichloracetic acid to obtain the intermediate lactam, 3-oxo-1,2,3,7,8,12b-hexa-hydrobenzo[6,7]cyclohept [1,2,3,-d,e]isoquinoline. The latter compound is reduced with a metal hydride to yield the desired starting material of Formula II in which $R^4$ and $R^5$ represent hydrogen, 1,2,3,7,8,12b-hexahydrobenzo [6,7]cyclohepta[1,2,3-d,e]isoquinoline. The same procedure may also be carried out with azulene derivatives substituted in the aromatic rings, to yield the desired starting materials of Formula II in which $R^4$ and $R^5$ represent substituents as defined above. The above process is also described in our co-pending U.S. patent application, S.N. 484,440, filed Sept. 1, 1965.

The starting materials of Formula II may be reacted with the salt, of a S-methylpseudothiourea of Formula III, wherein $R^1$, $R^3$ and $R^2$ are as defined above, and X represents the anion of an acid, for example hydrochloric or sulfuric acid, to yield the corresponding salt of the compounds of Formula I. The condensation is effected by heating the reactants of Formulae II and III together in a suitable solvent or solvent mixture at a temperature up to 150° C. Suitable solvents include water and alcohols having boiling points up to 150° C., or mixtures thereof.

Alternatively, the compounds of Formula II, in the form of their acid addition salts with suitable acids HX, where X represents the anion of an acid such as, for example, hydrochloric acid or sulfuric acid, may be reacted with the cyanamides of Formula IV, wherein $R^2$ and $R^3$ are as defined above, to yield the corresponding acid addition salts of Formula I, wherein $R^1$ is necessarily a hydrogen atom. This condensation may be effected in the absence of a solvent and at a temperature up to 200° C. or in the presence of an inert solvent and at a temperature up to 150° C. Suitable solvents include inert aromatic hydrocarbons, such as, for example, toluene and xylene.

EXAMPLE 1

*1,2,3,7,8,12b-hexahydrobenzo[6,7]cyclohepta[1,2,3-d,e]isoquinoline-2-carboxamidine*

1,2,3,7,8-12b - Hexahydrobenzo[6,7]cyclohepta[1,2,3-d,e] isoquinoline (11.9 gm., 0.05 mole) is dissolved in estanol (100 ml.) and S-methylpseudothiourea sulfate (7.24 gm. 0.025 mole) dissolved in 1:1 ethanol:water (120 ml.) is added over 5 minutes. The mixture becomes cloudy but on heating on the steam bath homogeneity is achieved accompanied by the vigorous evolution of methyl mercaptan. Heating is continued for 1.5 hours, then more S-methylpseudothiourea sulfate (1.0 gm.) is added, followed by further heating for 4 hours. The mixture is allowed to stand at room temperature overnight and a precipitate is filtered off and identified as a sulfate salt of the starting material. The mother liquors are freed of ethanol in vacuo, heated with charcoal and diluted with acetone to yield the title compound as a fluffy white solid which is recrystallized from ethanol-water (1:1) and dried at 100° C. It has M.P.>200°, $\nu_{max}$ 1605 and 1705 cm$^{-1}$, and its composition is confirmed by elemental analysis. The free base 1,2,3,7,8,12b-hexahydrobenzo[6,7]cyclohepta[1,2,3-d,e]isoquinoline-2-carboxamidine is obtained from the above sulfate salt by treating its aqueous solution with sodium hydroxide and extracting with chloroform. It is obtained as a light yellow oil and its infrared spectrum in chloroform exhibits bands at 1575 cm.$^{-1}$ and at 1630 cm.$^{-1}$.

By working in a similar manner as above but using instead of S-methylpseudothiourea sulfate, S-methyl-N-butyl-N$^1$-methylisothiouronium iodide, N-butyl-N$^1$-methyl-1,2,3,7,8,12b - hexahydrobenzo[6,7]cyclohepta[1,2,3,d,e]isoquinoline-2-carboxamidine is obtained as the iodide salt.

EXAMPLE 2

*1,2,3,7,8,12b-hexahydrobenzo[6,7]cyclohepta[1,2,3-d,e]isoquinoline-2-carboxamidine*

1,2,3,7,8,12b - hexahydrobenzo[6,7]cyclohepta[1,2,3-d,e]isoquinoline-2-carboxamidine (11.9 g. 0.05 mole) is converted to the hydrochloride salt and the latter is mixed with a molar excess of cyanamide and heated to 150° C. for 2 hours. The solid residue is crystallized from an ethanol-water mixture to yield the hydrochloride salt of the title compound which may be converted to the free base in the same manner as described in Example 1.

By working in the same manner, but using N,N-dimethyl cyanamide instead of cyanamide there is obtained the hydrochloride salt of N,N-dimethyl-1,2,3,7,8,12b-hexahydrobenzo[6,7]cyclohepta[1,2,3 - d,e]isoquinoline-2-carboxamidine, which is converted to the free base in the same manner as described above.

We claim:
1. A compound selected from the group which comprises compounds of the formula

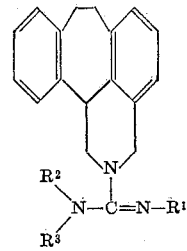

wherein $R^1$, $R^2$, and $R^3$ are selected from the group consisting of hydrogen and lower alkyl and may be identical or different substituents; and salts of said compounds with pharmacologically acceptable acids.

2. 1,2,3,4,7,8,12b - hexahydrobenzo[6,7]cyclohepta[1,2,3-d,e]isoquinoline-2-carboxamidine, as claimed in claim 1.

3. The sulfate salt of 1,2,3,7,8,12b-hexahydrobenzo[6,7]cyclohepta[1,2,3-d,e]isquinoline - 2 - carboxamidine, as claimed in claim 1.

4. N-butyl-N$^1$-methyl - 1,2,3,7,8,12b - hexahydrobenzo[6,7]cyclohepta[1,2,3 - d,e]isoquinoline-2-carboxamidine, as claimed in claim 1.

5. The iodine salt of N-butyl-N$^1$-methyl-1,2,3,7,8,12b-hexahydrobenzo[6,7]cyclohepta[1,2,3 - d,e]isoquinoline-2-carboxamidine, as claimed in claim 1.

6. The hydrochloride salt of 1,2,3,7,8,12b-hexahydrobenzo[6,7]cyclohepta[1,2,3-d,e]isoquinoline - 2 - carboxamidine, as claimed in claim 1.

7. N,N - dimethyl - 1,2,3,7,8,12b-hexahydrobenzo[6,7]cyclohepta[1,2,3 - d,e]isoquinoline-2-carboxamidine, as claimed in claim 1.

8. The hydrochloride salt of N,N-dimethyl-1,2,3,7,8,12b-hexahydrobenzo[6,7]cyclohepta[1,2,3 - d,e]isoquinoline-2-carboxamidine, as claimed in claim 1.

References Cited

UNITED STATES PATENTS

| | | | |
|---|---|---|---|
| 3,285,488 | 6/1966 | Judd et al. | 260—283 X |
| 3,291,799 | 12/1966 | Wenner | 260—286 |
| 3,310,565 | 3/1967 | Galantay | 260—288 |

NICHOLAS S. RIZZO, *Primary Examiner.*

D. DAUS, *Assistant Examiner.*